US008438388B2

(12) United States Patent
Thomas et al.

(10) Patent No.: US 8,438,388 B2
(45) Date of Patent: May 7, 2013

(54) METHOD AND APPARATUS FOR DISTRIBUTING CERTIFICATE REVOCATION LISTS (CRLS) TO NODES IN AN AD HOC NETWORK

(75) Inventors: Shanthi E. Thomas, Carpentersville, IL (US); Erwin Himawan, Chicago, IL (US); Ananth Ignaci, Lake-in-the-Hills, IL (US); Anthony R. Metke, Naperville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1437 days.

(21) Appl. No.: 12/059,666

(22) Filed: Mar. 31, 2008

(65) Prior Publication Data

US 2009/0249062 A1 Oct. 1, 2009

(51) Int. Cl.
*H04L 9/32* (2006.01)
(52) U.S. Cl.
USPC ........... 713/168; 713/169; 713/170; 713/171; 713/172; 713/173; 713/155; 713/156; 713/157; 713/158; 380/231; 380/232; 380/255; 726/26; 726/27; 726/28; 726/29; 726/30; 709/225
(58) Field of Classification Search .................... 713/158
See application file for complete search history.

(56) References Cited

U.S. PATENT DOCUMENTS

| 8,261,073 | B2* | 9/2012 | Oh et al. ........................ 713/168 |
| 2002/0004773 | A1* | 1/2002 | Xu et al. .......................... 705/36 |
| 2003/0055894 | A1* | 3/2003 | Yeager et al. ................. 709/204 |
| 2005/0053045 | A1* | 3/2005 | Chmora et al. ............... 370/338 |
| 2007/0236568 | A1 | 10/2007 | Metke et al. |
| 2007/0294526 | A1* | 12/2007 | Medvinsky et al. .......... 713/158 |

OTHER PUBLICATIONS

Matei Ciobau Morogan and Sead Muftic—"Certificate Revocation System Based on Peer-to-Peer CRL Distribution"—Proceedings of the DMS03 Conference, Miami, US, Sep. 2003—6pp.
M. C. Morogan et al., "Certificate Management in Ad Hoc Networks," Appliications and Internet Workshops, vol. 27, Issue 31, 2003, p. 337-341.

\* cited by examiner

*Primary Examiner* — Nathan Flynn
*Assistant Examiner* — Bryan Wright

(57) ABSTRACT

A method and apparatus for distributing Certificate Revocation List (CRL) information in an ad hoc network are provided. Ad hoc nodes in an ad hoc network can each transmit one or more certificate revocation list advertisement message (s) (CRLAM(s)). Each CRLAM includes an issuer certification authority (CA) field that identifies a certification authority (CA) that issued a particular certificate revocation list (CRL), a certificate revocation list (CRL) sequence number field that specifies a number that specifies the version of the particular certificate revocation list (CRL) that was issued by the issuer certification authority (CA). Nodes that receive the CRLAMs can then use the CRL information provided in the CRLAM to determine whether to retrieve the particular certificate revocation list (CRL).

21 Claims, 7 Drawing Sheets

METHOD AND APPARATUS FOR DISTRIBUTING CERTIFICATE REVOCATION LISTS (CRLS) TO NODES IN AN AD HOC NETWORK

FIELD OF THE DISCLOSURE

The present disclosure relates generally to wireless ad hoc communication networks and more particularly to methods and apparatus for providing certificate revocation list(s) (CRL(s)) to nodes in an ad hoc network.

BACKGROUND

Modern cryptography and network security systems often employ certificate-based authentication mechanisms to verify that a public key belongs to a particular computing device associated with a particular entity or person. A "public key" or "identity" certificate is signed data structure (e.g., an electronic document) which incorporates a digital signature to bind a public key with an identity (i.e., information such as the name of a person or an organization, their address, device address, and so forth). In a typical public key infrastructure (PKI) scheme, Certification Authority (CA) generates or "issues" certificates that are signed with the private key of the CA. The issuer CA also defines a validity period of the certificate. In some cases, a certificate can be revoked even before this validity period expires. In internetworking and computer network engineering, Request for Comments (RFC) documents are a series of memoranda encompassing new research, innovations, and methodologies applicable to Internet technologies. The Internet Engineering Task Force (IETF) adopts some of the proposals published in RFCs as Internet standards. One may retrieve almost any individual, published RFC via the following URL: http://www.rfc-editor.org/rfc. The Internet Engineering Task Force (IETF) Request for Comments (RFC) 3280 defines some of the reasons for revoking a certificate. For example, a certificate may be revoked when the certificate's corresponding private key is compromised, when the affiliation of the owner has changed, etc. Thus, the process of validating certificates not only involves verifying the issuer CA's signature and the certificate's validity period, but also involves checking the certificate's revocation status. One technique for checking the certificate's revocation status involves checking a Certificate Revocation List (CRL).

CRLs are widely used to distribute information about revoked certificates. A CA generates or issues a certificate revocation list (CRL) to report revocation of any certificates issued by that CA. The issuer CA can generate a CRL either periodically (i.e., after a clearly defined timeframe) and/or immediately after a certificate has been revoked. A CRL typically includes information about the identity of the issuer of the CRL, the certificate serial number, the effective date of the CRL, the expected next update of the CRL, the algorithm used to sign the list of revoked certificates, a list of certificate serial numbers which identify certificates that have been revoked, and the effective date when each certificate was revoked and a digital signature of the body of the CRL generated by the issuing CA that can be used to validate the CRL prior to trusting accuracy of its content. It is desirable that entities have the most current CRL(s) when performing certificate validation. As such, entities should receive updates to CRLs (i.e., updated CRLs) as soon as possible after the issuer CA updates them. Given the large amount of information in a CRL, and the fact that updates to the CRL need to be retrieved or downloaded frequently by end-users to insure the timeliness of the revocation information, the process of retrieving CRLs can be quite costly in terms of network resources.

Implementing certificate-based authentication mechanisms in an ad hoc network can present a number of challenges given the unique properties of ad hoc networks. For example, because an ad hoc network is not necessarily connected to the infrastructure at all times, infrastructure entities, including a CRL distribution point, may not always be accessible. In addition, it is desirable that the amount data overhead in communications be limited due to the bandwidth limitations in ad hoc networks.

One particular challenge to implementing certificate-based authentication mechanisms in ad hoc networks relates to providing nodes with CRLs (and updates to those CRLs). In ad hoc networks, nodes can not always retrieve CRLs using standard CRL retrieval schemes since nodes do not always have access to infrastructure. In many cases, each node in the ad hoc network will not have stored the same versions of the CRL(s). This can happen, for example, when one of the nodes in the ad hoc network has not connected to the infrastructure since the most recent CRL update.

Other techniques that have been developed for providing CRLs to nodes in an ad hoc network also suffer from other problems including: unnecessary data overhead (especially if there are CRLs from more than one CA), multiple broadcasts of the same CRL(s) from different nodes, and preventing nodes in the ad hoc network from obtaining the latest available CRL.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
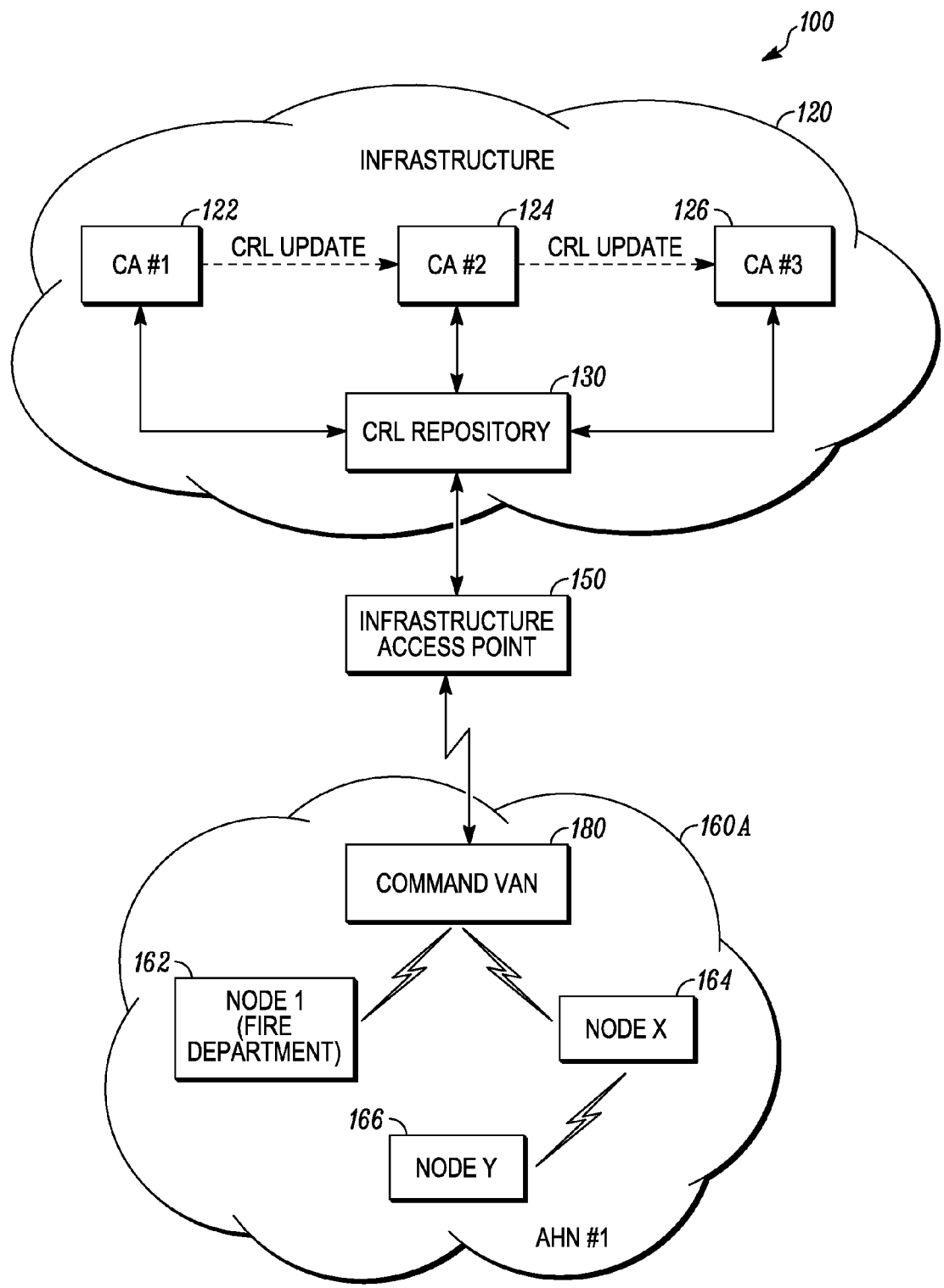
FIG. 1A is a block diagram which illustrates a communications network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Techniques are provided for efficiently distributing Certificate Revocation Lists (CRL) information amongst nodes in an ad hoc network (e.g., an autonomous ad hoc network). In accordance with these techniques a new advertisement message is provided and a new protocol is provided that defines how nodes use information provided in the new advertisement message to decide whether to retrieve new or updated CRLs. According to these techniques, ad hoc nodes in an ad hoc network can transmit or broadcast specified CRL information to neighbor ad hoc nodes. Upon receiving this CRL information, a recipient ad hoc node can use the CRL information to decide whether to retrieve a new (or updated) CRL. If the ad hoc node decides to retrieve a new (or updated) CRL, then the ad hoc node verifies/validates the CRL upon retrieving it, and if the verification/validation is successful, then the ad hoc node stores the CRL locally and re-advertises the latest CRL information to its neighbor nodes. The disclosed techniques can allow for the efficient propagation of the latest CRL throughout an ad hoc network so that ad hoc nodes can be alerted when a CRL has been updated prior to the regular update period. Any node joining the ad hoc network can access CRLs without being pre-configured with information regarding the location of the nodes having the CRLs.

In one implementation, a method and apparatus for distributing Certificate Revocation List (CRL) information in an ad hoc network is provided. Ad hoc nodes in an ad hoc network can each transmit one or more certificate revocation list advertisement message(s) (CRLAM(s)). Each CRLAM includes an issuer certification authority (CA) field that identifies a certification authority (CA) that issued a particular certificate revocation list (CRL), a certificate revocation list (CRL) sequence number field that specifies a number that specifies the version of the particular certificate revocation list (CRL) that was issued by the issuer certification authority (CA). Nodes that receive the CRLAMs can then use the CRL information provided in the CRLAM to determine whether to retrieve the particular certificate revocation list (CRL).

Embodiments of the present invention can apply to a number of network configurations. Prior to describing some embodiments with reference to FIGS. 2-4, a few examples of network configurations in which these embodiments can be applied will now be described with reference to FIGS. 1A-1D.

FIG. 1A is a block diagram which illustrates a communications network 100. The communications network 100 of FIG. 1A illustrates one example of a particular type of ad hoc network sometimes referred to as an incident scene network (ISN) or more particularly a vehicular area network (VAN). ISNs and VANs are designed to serve incidents and events such as fires, natural disaster scenes, special events such as sporting events and conventions, emergency scenes and accident scenes. Communications at incident scenes or events can be challenging for a number of reasons. In many cases, the incident scene or event will involve hundreds of personnel who need to coordinate their efforts, and who need access to shared communications resources and tools for group communication. Personnel at such incident scenes and events require a comprehensive set of instant, on-site communication tools which preferably combine easily deployable applications, devices and networks that rapidly give personnel information they need. In many cases, incident scene management, event management, and disaster recovery operations require on-demand, portable wireless communication solutions, which may work to either extend existing coverage to remote areas or to provide coverage in places where fixed infrastructure does not exist. Although the communications network 100 of FIG. 1A illustrates one example of an ISN that employs a command van 180, it will be appreciated that not all incident scene networks use a command "van." In some ISNs, instead of a command VAN, entities such as a command post or command module perform the same or similar functions. As such, the command van 180 can generally represent any command post or command module commonly used at an ISN.

In this particular example, the communications network 100 includes infrastructure 120 that includes a number of certification authorities (CAs) 122-126 and at least one CRL repository 130, an infrastructure device 150 such as an access point (AP), access port and wireless switch or base transceiver station (BTS), and an infrastructure-connected ad hoc network 160A that includes a number of nodes 162-166 and 180. In the following description of FIG. 1A, the infrastructure device 150 will be referred to as an infrastructure access point 150; however, the infrastructure device 150 can be any of the infrastructure devices described above. The various entities in FIG. 1A are well-known in the art, and therefore will not be described in detail herein. It will be appreciated by those skilled in the art that the infrastructure 120 typically includes a number of entities that are not illustrated in FIG. 1A for purposes of simplicity.

Although a single infrastructure access point 150 is illustrated, in many implementations more than one infrastructure access point device can be present. In addition, while the infrastructure-connected ad hoc network 160A illustrates four nodes 162-166 and 180, an ad hoc network can generally include any number of nodes which communicate with one another (either directly or indirectly). As used herein, "nodes" are wireless communication devices which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. When a node operating as part of an ad hoc network encounters an ad hoc neighbor node, the ad hoc node will seek to authenticate with the ad hoc neighbor node in part by attempting to validate the ad hoc neighbor node's certificate based on CRL(s) stored locally at the ad hoc node.

The various CAs 122-126 can generate or "publish" CRLs on a regular basis, and provide these CRLs to the CRL repository 130 that serves as a CRL distribution point. Each CA 122-126 creates a CRL containing revocation information about certificates it has issued, and specifies a validity period for which the CRL is valid. In addition, in some implementations, the CAs 122-126 can communicate CRLs with one another. Any nodes that are able to connect to the infrastructure access point 150 can retrieve one or more CRLs from the CRL repository 130, and cache the CRLs until their validity periods expire. At some point in time before the CRLs expire, the nodes can attempt to retrieve an updated CRL from the CRL repository 130.

Figure 1B:
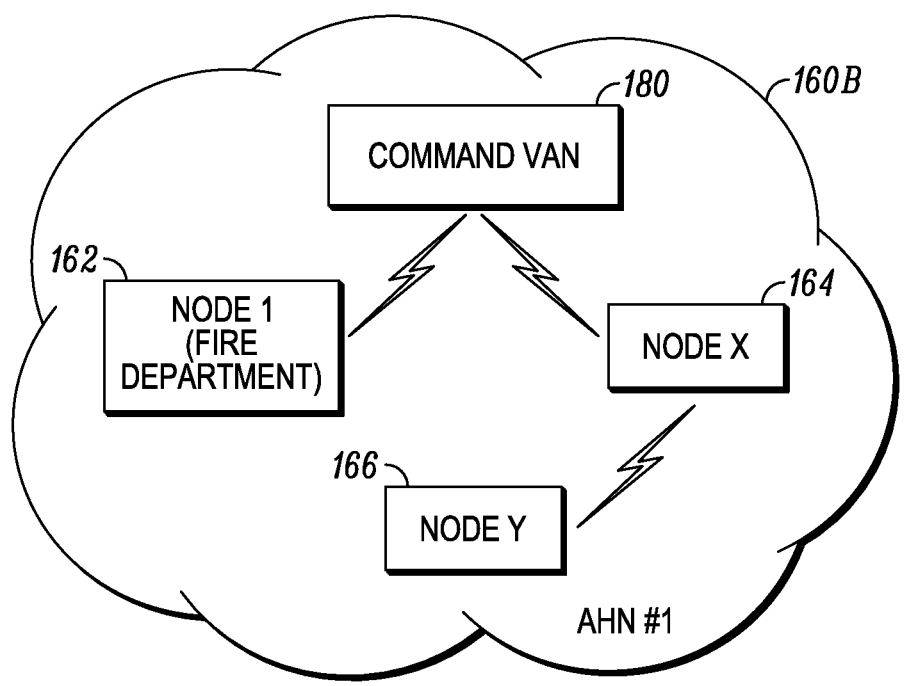
FIG. 1B is a block diagram which illustrates an autonomous ad hoc network in which there is no connection to infrastructure by any of the nodes of the ad hoc network.

In this particular example, the command van 180 can connect to and communicate with the CRL repository 130 via the infrastructure access point 150. Among other things, the command van 180 can retrieve CRLs generated by one or more of the CAs 122-126 (e.g., the CA 122) from the CRL repository 130, and can then distribute the CRLs to other nodes 162, 164 in the ad hoc network 160A that lack a connection to the infrastructure access point 150. The nodes 162, 164 can then communicate the CRLs to other neighbor nodes (e.g., node Y 166) in the ad hoc network. In some operating scenarios, the command van 180 and other nodes 162-166 can lose their ability to communicate with infrastructure access point 150 (e.g., when nodes move away from an infrastructure connection). In this case, the infrastructure-connected ad hoc network 160A becomes a pure or "autonomous" ad hoc network 160B, as illustrated in FIG. 1B, in which there is no connection to infrastructure by any of the nodes that make up the ad hoc network. Ad hoc network 160B includes the same entities as the ad hoc network 160A of FIG. 1A. This scenario is common, for example, in public-safety incident scene (IS) ad hoc networks or vehicular area networks (VANs). As used herein, the term "autonomous ad hoc network" refers to a network of nodes in which none of the ad hoc nodes has a connection to infrastructure.

Figure 1C:
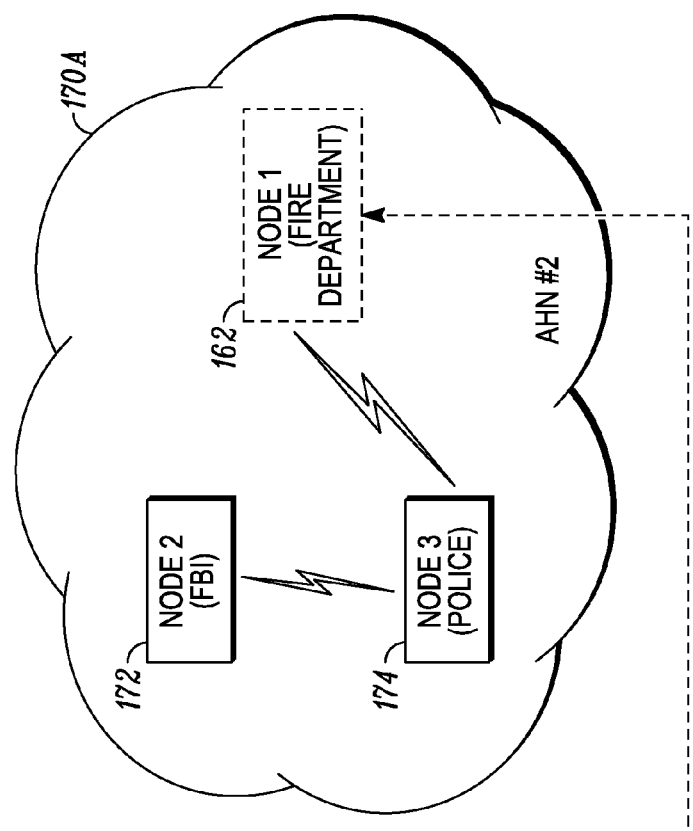
FIG. 1C is a block diagram which illustrates two disconnected, autonomous ad hoc networks.
Figure 1C:
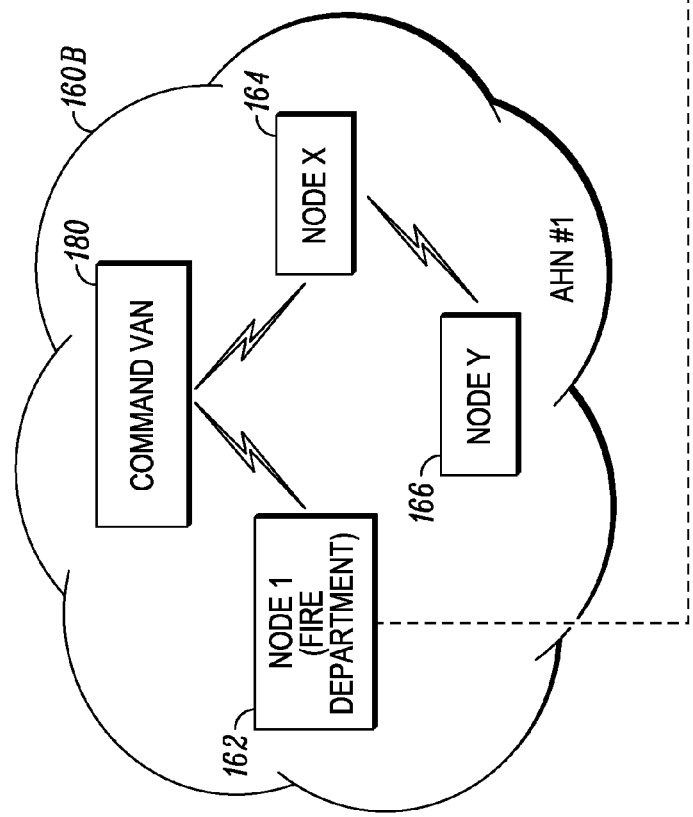
Figure 1D:
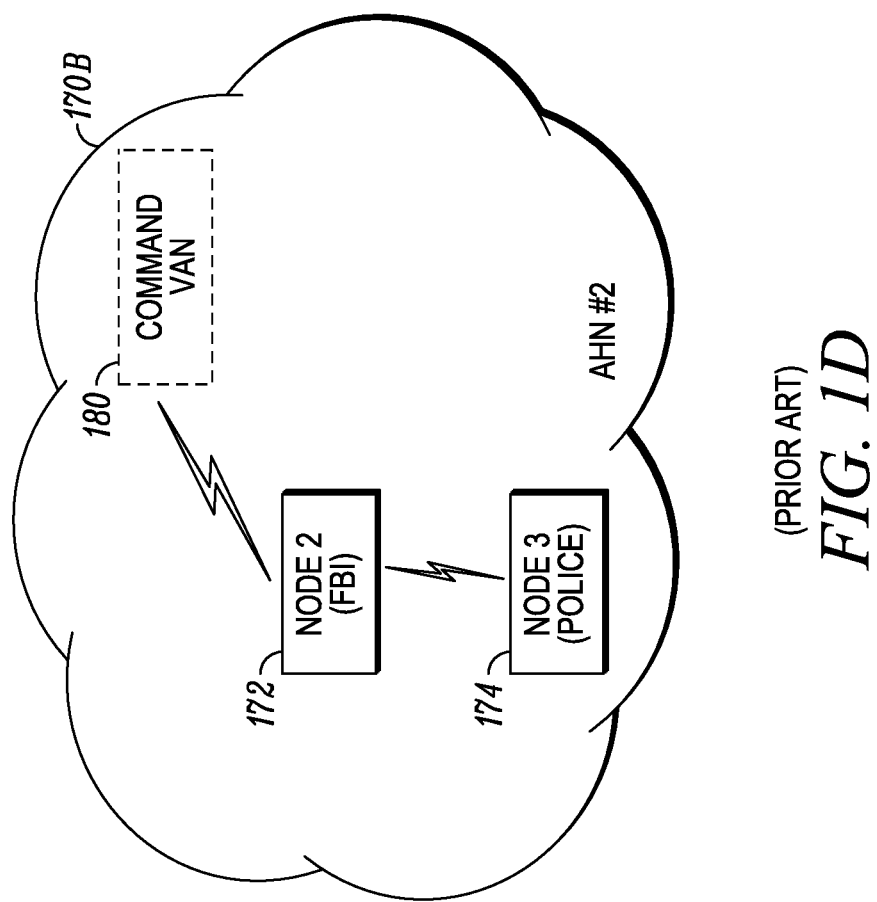
FIG. 1D is a block diagram which illustrates a scenario where a command van of FIG. 1A has moved to a new autonomous ad hoc network.

In some operating scenarios, a node in one autonomous ad hoc network may move out of that network and into another autonomous ad hoc network. FIG. 1C is a block diagram which illustrates two disconnected, autonomous ad hoc networks 160B, 170A. In this example, the dashed-line arrow indicates that node 162 has moved or "roamed" from ad hoc network 160B to ad hoc network 170A. If node 162 obtained CRLs while being part of autonomous ad hoc network 160B, then node 162 can distribute (either directly or indirectly) these CRLs to nodes in its new autonomous ad hoc network 170A. As another example, FIG. 1D is another block diagram which illustrates a scenario where the command van 180 of FIG. 1A has moved or roamed to a new autonomous ad hoc networks 170B. In other words, the command van 180 has moved or "roamed" from ad hoc network 160A to autonomous ad hoc network 170B. If the command van 180 has retrieved CRLs while being part of network 160A, then command van 180 can distribute (either directly or indirectly) these CRLs to nodes 172, 174 in its new autonomous ad hoc network 170B.

To distribute Certificate Revocation List (CRL) information among nodes in an ad hoc network, ad hoc nodes operating in accordance with the disclosed embodiments generate and transmit a CRL advertisement message(s) (CRLAMs) on a regular basis using CRL information for each of the CRLs that the particular ad hoc node has stored locally. Each node in an ad hoc network can generate and broadcast CRLAMs to announce a variety of information associated with CRLs stored at the node. The CRLAMs can be advertised on a regular basis or periodically. It should be noted that the CRLAM does not advertise actual CRLs, but just CRL information or "meta data," for instance that identifies the CRL, its issuer and its serial number. Recipient ad hoc nodes can then decide whether to obtain the actual CRL based on this CRL information. In the following description, examples will be described where CRLAMs are transmitted over-the-air (OTA); however, it will be appreciated by those skilled in the art that the same or similar techniques for distributing Certificate Revocation List (CRL) information among nodes in a wireless ad hoc network can be applied in wired ad hoc networks and even more generally in local area networks (LANs).

Figure 2:
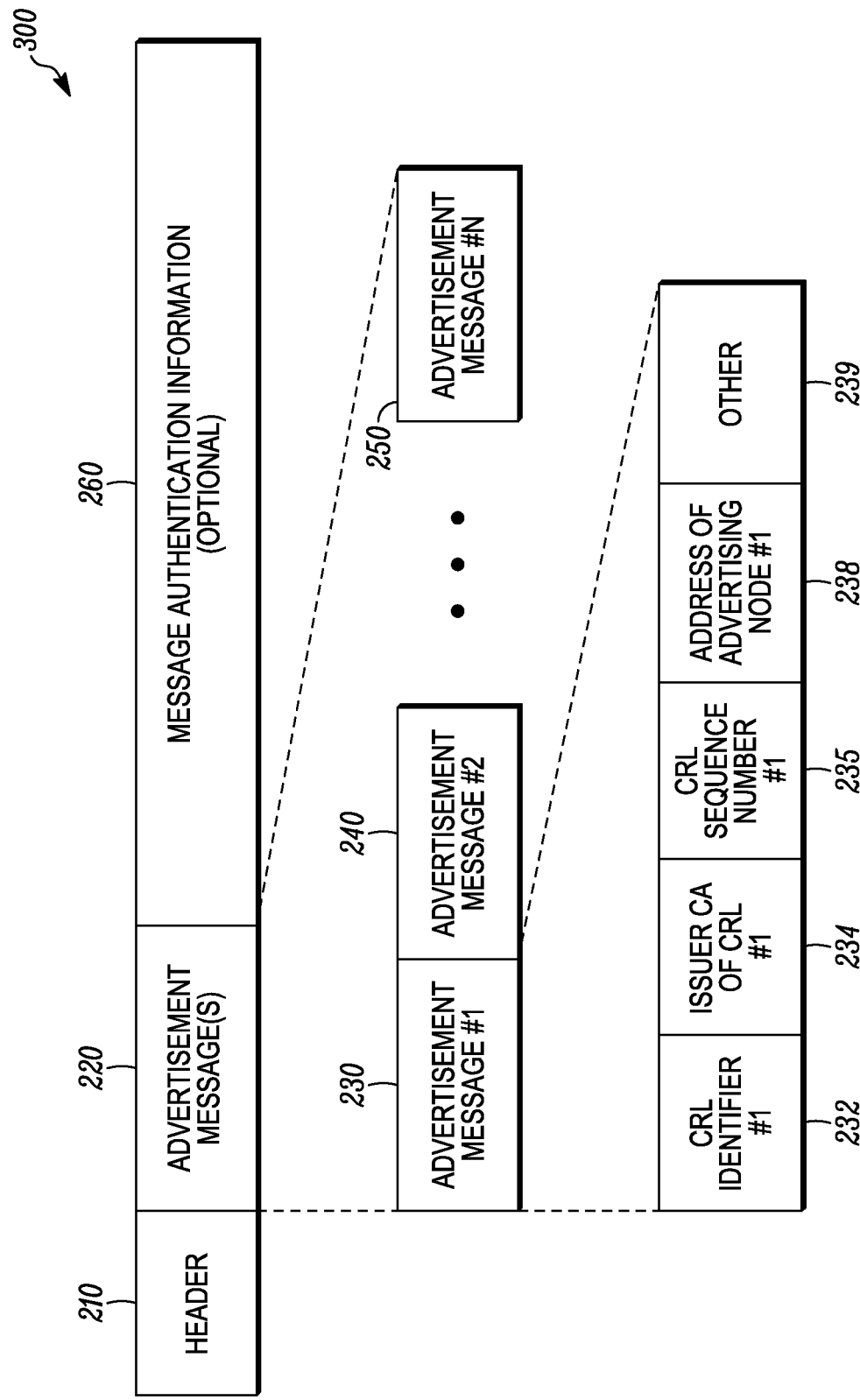
FIG. 2 is a data structure diagram of a frame that includes CRL advertisement messages (CRLAMs) including a CRL advertisement message (CRLAM) in accordance with some embodiments.

FIG. 2 is a data structure diagram of a frame 200 that includes CRL advertisement messages (CRLAMs) 220 including a CRL advertisement message (CRLAM) 230 in accordance with some embodiments. In general, the frame 200 includes a header 210, at least one CRLAM 220 (in this case "n" CRLAMs 230-250 are illustrated), and optional message authentication information 260. The particular transport mechanism (i.e., frame structure) used to carry the CRLAM over-the-air can vary depending on the implementation. In general the CRLAMs can be implemented as information elements or fields in any messages, including advertisement messages, which are transmitted on a regular basis by a node in an ad hoc network. For example, in one implementation, a "HELLO message" which includes addressing and routing information can be modified to include additional information elements or fields of a CRLAM. Alternatively, the additional information elements or fields of a CRLAM can be transmitted as part of a beacon message, a neighbor advertising message, a routing advertising message, or a link state advertising message. In one implementation described below with reference to FIG. 4, the CRLAMs are transmitted or distributed to other nodes in an ad hoc network as part of existing Resource Advertisement Protocol (RAP) advertisement messages. RAP advertisement messages are disclosed in United States Patent Application Publication 2007/0236568 A1, entitled "Method and system for communicating incident scene information," assigned to the assignee of the present invention, its contents being incorporated by reference in its entirety herein. As such, it should be appreciated that the particular type of frame used to carry or transport a "CRLAM" message is not to be interpreted in a restrictive sense.

As illustrated in FIG. 2, the CRLAM 230 comprises a CRL identifier field 232 that identifies the CRL being advertised, a CRL number field 235 that indicates a CRL number unique to a given CA that can be used to uniquely identify a given CRL, an issuer CA field 234 that identifies the CA that generated and issued the CRL, and an address field 238 that specifies the address where a copy of the CRL being advertised in the CRLAM 230 can be obtained. In some implementations, the CRLAM 230 can also include an "other" field 239 for specifying other information such as a valid date that indicates how long the CRL is valid for. Notably, the CRLAM 230 does not identify the individual certificates (e.g., by serial numbers) of the CRL thereby reducing the amount of information communicated to nodes when providing information regarding updates to a CRL. By including a limited amount of CRL information in the CRLAM data overhead or bandwidth usage can be reduced when providing information regarding updates to a CRL.

The CRL identifier field 232 is an authority key identifier and can be implemented in situations where the issuer CA is responsible for generating and issuing more than one CRL. An authority key identifier is a data structure defined in the X.509 standard, and is used only when a CA has multiple signing keys. An authority key identifier identifies which signing key this CRL corresponds to.

Although not illustrated in FIG. 2, the issuer CA field 234 can include an issuer name and serial number of the issuer CA certificate. Depending on the implementation, the issuer CA field 234 can identify the CA issuer that generated and issued the CRL based on, for example, the OU field of the issuing CA's Distinguished Name (DN), or the Common Name (CN) field of the DN. In both cases the DN of the issuing CA is the common factor.

Although a CRL number field 235 is illustrated in this embodiment, in other embodiments an effective date field (not illustrated) that specifies an effective date of the CRL, and this effective date can also be used to uniquely identify a given CRL.

As described below, the ad hoc node that receives a CRLAM can use the address specified in the address field 238 to obtain the CRL. In some cases, the address field 238 can be an address of the advertising node that generated the CRLAM 230, whereas in other cases the address field 238 can be an address of another node which broadcast a previous CRLAM containing a record for the CRL that is currently being advertised. The address specified in the address field 238 can be an IP address, a URL address, a MAC address, etc.

As illustrated in FIG. 2, a frame 200 can include multiple CRLAMs 230-250, where each CRLAM 230-250 is associated with a particular CRL. This way the method 200 can support advertising multiple CRLs from multiple CAs in one transmission by a single node so that different CRLs can be advertised in one CLRAM. By including CRL information associated with multiple CRLs from multiple CAs in a single CRLAM, the CRLAM data overhead or bandwidth usage can be reduced even in the presence of multiple CRLs from different CAs. This can be important, for example, in incident scene networks with multiple agencies present, each having a different CA. This applies even if the CAs are from different security domains (e.g., different public safety agencies). Thus, these features can allow for the propagation of CRL information from many CAs and/or many security domains in a single message. This can be desirable in some ad hoc networks (e.g., those that require inter-agency interaction between fire, police, FEMA, etc.) since it allows nodes to obtain CRLs pertaining to more than one CA.

Figure 3:
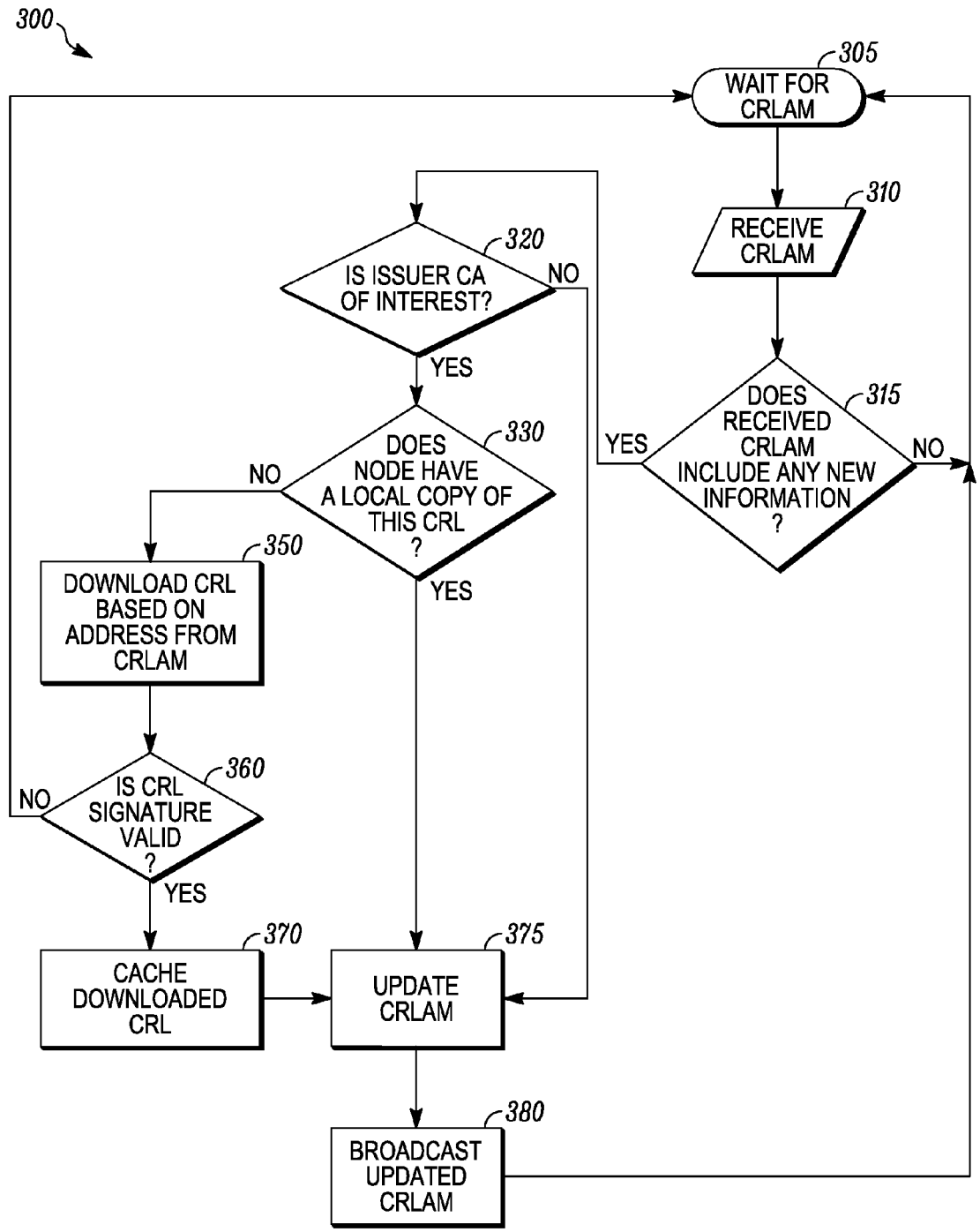
FIG. 3 is a flow chart which illustrates a method for distributing Certificate Revocation List (CRL) information in an ad hoc network in accordance with some embodiments.

FIG. 3 is a flow chart which illustrates a method 300 for distributing Certificate Revocation List (CRL) information in an ad hoc network in accordance with some embodiments. In some implementations, method 300 can be implemented in an ad hoc network where one or more nodes has access to an infrastructure device (e.g., in a network such as that illustrated in FIG. 1A), whereas in other implementations method 300 can be implemented in an autonomous ad hoc network where none of the nodes have infrastructure access (e.g., in a network such as that illustrated in FIG. 1B or FIG. 1C) and therefore no longer have a connection to the CRL repository or distribution point. Moreover, although one example of method 300 will be described below for distributing CRL information associated with a single CA throughout an ad hoc network, in other embodiments, the same techniques can be used for distributing CRL information associated with multiple CAs throughout an ad hoc network. In addition, while method 300 will be described as operating at a single ad hoc node, it will be appreciated that multiple ad hoc nodes can execute method 300 simultaneously in parallel.

Prior to method 300, it is assumed that at least one node has recently connected to a CRL repository or distribution point via infrastructure, obtained CRL information from the CRL repository or distribution point via the infrastructure, and stored the CRL information for later distribution. For example, conventional methods for obtaining CRL information can be used, such as, obtaining the CRL from a CRL repository or distribution point listed in a CRLDistributionPoint field of a corresponding certificate.

Method 300 begins at step 305, where an ad hoc node waits to receive a CRLAM. In one implementation, the ad hoc node can monitor a pre-defined port for CRLAMs broadcast from other nodes.

When the ad hoc node receives a CRLAM 230 at step 310, the method 300 proceeds to step 315, where the ad hoc node determines whether the received CRLAM 230 includes any new CRL information. For example, in one implementation, the ad hoc node can read a CRL identifier field 232 and an issuer CA field 234 in the CRLAM 230, and compare the CRL identifier from the CRL identifier field 232 and the issuer CA from the issuer CA field 234 to a list of corresponding CRL identifiers and issuer CAs stored locally at the ad hoc node to determine whether the CRL identifier from the CRL identifier field 232 and the issuer CA from the issuer CA field 234 are different than those stored locally at the ad hoc node. If the CRL identifier from the CRL identifier field 232 and the issuer CA from the issuer CA field 234 are the same as those stored locally at the ad hoc node, the ad hoc node determines that the received CRLAM 230 does not include new CRL information, and method 300 loops back to step 305. If the CRL identifier from the CRL identifier field 232 and the issuer CA from the issuer CA field 234 are different than those stored locally at the ad hoc node, the ad hoc node determines that the received CRLAM 230 includes new CRL information, and method 300 proceeds to step 320.

At step 320, the ad hoc node can read the CRL identifier from the CRL identifier field 232 and the issuer CA from the issuer CA field 234 in the CRLAM 230 to determine whether the CRL identifier from the CRL identifier field 232 and the issuer CA from the issuer CA field 234 of the CRL being advertised in the CRLAM 230 is "of interest" to the ad hoc node. Here, a CLRAM is "of interest" to the ad hoc node if the ad hoc node has stored a CRL corresponding to the CRL that is the subject of the CRLAM. This way, the ad hoc node can independently discern which CRLs to acquire and need not be flooded with multiple CRLs from a CA or with CRLs of CAs that it does not need or is not interested in receiving. For example, in one implementation, the ad hoc node can compare the issuer CA and CRL identifier to a CA list of CAs and CRL identifiers stored at the ad hoc node, and determine if the issuer CA and CRL identifier matches one of the entries on the CA list. If the issuer CA of the CRL being advertised in the CRLAM 230 is not "of interest" to the ad hoc node, then method 300 proceeds to step 375, where the ad hoc node updates the CLRAM 230, and then to step 380, where the ad hoc node broadcasts the updated CRLAM 230 to other ad hoc nodes in the network. If the issuer CA of the CRL being advertised in the CRLAM 230 is "of interest" to the ad hoc node, then method 300 proceeds to step 330, where the ad hoc node determines whether it has a local copy of this CRL. In one implementation of step 330, the ad hoc node reads a CRL sequence number field 235 from the CRLAM 230, and determines whether this ad hoc node has a local copy of the CRL corresponding to the CRL sequence number specified in the CRL sequence number field 235 of the received CRLAM 230. In other words, at step 330, the ad hoc node can determine whether it has the most recent version of the CRL by comparing the CRL sequence number specified in the CRL sequence number field 235 with a sequence number of the corresponding CRL stored at the ad hoc node. As described above, the CRL sequence number field 235 is used to advertise a sequence number of a particular CRL that the node has stored locally and indicates version of the particular CRL that was issued.

If the ad hoc node does have a local copy of this CRL corresponding to the CRL identifier 232 in the received CRLAM 230, then method 300 proceeds to step 375 where the ad hoc node updates the CLRAM 230, and then to step 380, where the ad hoc node broadcasts the updated CRLAM 230 to other ad hoc nodes in the network.

If the ad hoc node does not have a local copy of this CRL (e.g., when the ad hoc node determines that the sequence number of the CRL being advertised in the CRL sequence number field 235 of the received CRLAM 230 is more recent than the sequence number of the CRL that is stored locally at the ad hoc node, and the CRL being advertised is "newer")), then method 300 proceeds to step 350 where the ad hoc node reads the address field 238 in the received CRLAM 230 to determine an address of the advertising node that generated this CRLAM, and then retrieves or "downloads" the CRL from the advertising node that generated this CRLAM based on an address field 238 from the CRLAM 230.

When the CRL has been retrieved, method 300 then proceeds to step 360, where the ad hoc node determines whether a signature of the CRL is valid by standard means which include validating the chain of certificates between the node's trust anchor and the issuing CA and then using the issuing CA's public key to verify the signature of the CRL. In this embodiment, if the signature of the CRL is not valid, then method 300 loops back to step 305.

If the signature of the CRL is valid, then method 300 proceeds to step 370, where the ad hoc node stores the retrieved CRL. At step 370, the ad hoc node can update its locally cached copy of the CRL in the ad hoc node's CRL database with the latest updated version of the retrieved CRL. The method 300 then proceeds to step 375 where the ad hoc node updates its locally stored CRLAM based on CRL information provided in the retrieved CRL to generate an updated CRLAM. At step 380, the ad hoc node broadcasts the updated CRLAM to its neighbor ad hoc nodes in the network to advertise the updated CRL information.

Thus, when the CRLAM has a more recent sequence number (as specified in the CRL sequence number field 235), the ad hoc node uses the address field 238 to retrieve the CRL, verifies that the CRL is valid by checking the CRL signature at step 360, stores the retrieved CRL (e.g., replaces the stored CRL) at step 370, updates the CRLAM at step 375, and re-advertises the new CRL by broadcasting the updated CRLAM at step 380.

As noted above, the particular transport mechanism (e.g., the particular type of frame) used to carry or transport the CRLAM can vary depending on the implementation. One exemplary implementation of a CRLAM will now be described below with reference to FIG. 4.

Figure 4:
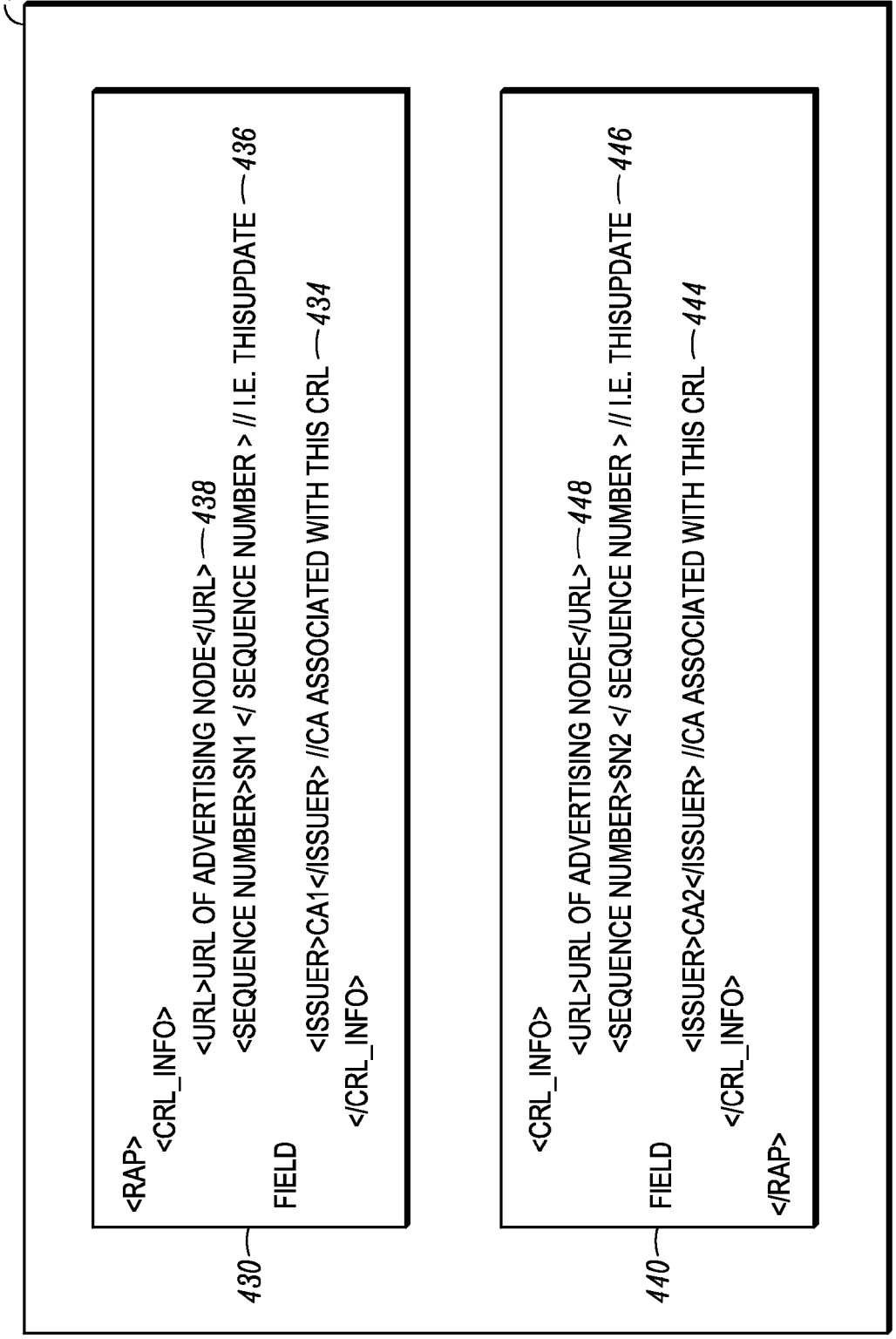
FIG. 4 is an XML data structure diagram which illustrates a CRL advertisement message (CRLAM) in accordance with an XML implementation.

FIG. 4 is an XML data structure diagram which illustrates a CRL advertisement message (CRLAM) 420 in accordance with an XML implementation. The implementation of FIG. 4 illustrated in FIG. 4 shows how CRLAMs 430, 440 coded in XML as part of a modified Resource Advertisement Protocol (RAP) advertisement message 420 that is transmitted or distributed to nodes in an ad hoc network. The Resource Advertisement Protocol (RAP) is a proprietary protocol that is used in an incident scene network. The RAP allows each node in an ad hoc network to advertise resource information (such as description and URLs corresponding to video cameras or data files to share within the ad-hoc network). In this embodiment, the RAP transport mechanism can be used to transport the CRL information (<CRL_Info> to </CRL_Info>) throughout an ad hoc network by allowing the ad hoc nodes to distribute and maintain information about other nodes and their resources. The existing RAP advertisement message (<RAP> to </RAP>) 420 defined by the RAP is modified to include new CRL information elements or fields for implementing the CRLAM. Since this implementation builds on top of the existing RAP, this particular implementation will not introduce additional protocol overhead.

As illustrated in FIG. 4, the CRLAM 420 can include multiple CRLAMs 430, 440, where each CRLAM 430, 440 is associated with a particular CRL so that multiple CRLs from multiple CAs (CA1, CA2) can be advertised in one transmission (i.e., one CLRAM 420) by a single node. By including CRL information associated with multiple CRLs in a single CRLAM 420, the CRLAM data overhead or bandwidth usage can be reduced.

As illustrated in FIG. 4, new CRL information elements or fields for implementing the CRLAM 430 include an address field (<url> to </url>) 438 that specifies a Uniform Resource Locator (URL) of the advertising node where a copy of the CRL being advertised in the CRLAM 430 can be obtained, CRL sequence number field (<sequence number> to </sequence number>) 436 that specifies the version of the CRL and an issuer CA field (<issuer> to </issuer>) 434 that identifies the CA (CA1) that is associated with (i.e., that generated and issued) the CRL. The ad hoc node that receives the CRLAM 430 can use the URL specified in the address field (<url> to </url>) 438 to obtain the CRL. In some cases, the address field (<url> to </url>) 438 can be the URL of the advertising node that generated the CRLAM 430, whereas in other cases the address field (<url> to </url>) 438 can be the URL of another node. In this implementation, the URL specified in the address field (<url> to </url>) 438 is the URL address of the advertising node. The issuer CA field (<issuer> to </issuer>) 434 can identify the CA issuer (CA1) that generated and issued the CRL and can be based on, for example, the OU field of the issuing CA's Distinguished Name (DN), or the Common Name (CN) field of the DN. The CRL sequence number field (<sequence number> to </sequence number>) 436 can be specified in the "sequence number" field of the CRL.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for distributing certificate revocation list (CRL) information over a communication channel within an ad hoc network, comprising:
   at each ad hoc node of a plurality of ad hoc nodes in the ad hoc network:
   receiving, from a neighbor ad hoc node in the ad hoc network, a data message comprising at least one certificate revocation list advertisement message (CRLAM) indicating the availability of CRL information within the ad hoc network, wherein the CRLAM includes an address field that specifies an address where a copy of a particular certificate revocation list (CRL) is located;
   determining, at each of the ad hoc nodes, based on the address field in the received CRLAM, an address of an advertising node that generated the CRLAM;
   determining whether the received CRLAM includes new CRL information;
   retrieving the new CRL information being advertised in the CRLAM from the advertising node that generated the CRLAM based on the address of the advertising node;
   determining, at each of the ad hoc nodes, whether a signature of the retrieved CRL is valid;
   storing, at each of the ad hoc nodes, the retrieved new CRL information in a CRL database of the respective ad hoc node when the respective ad hoc node determines that the signature of the retrieved CRL is valid; and
   updating, at each of the ad hoc nodes, a local CRLAM based on the new CRL information provided in the retrieved new CRL information to generate locally updated CRLAM; and
   transmitting the updated CRLAM to other neighbor ad hoc nodes in the ad hoc network.

2. The method as claimed in claim 1, wherein the determining at each of the ad hoc nodes comprises:
   determining based on an issuer certification authority (CA) field in the CRLAM, whether an issuer certification authority (CA) is of interest to the respective ad hoc node; and
   obtaining new CRL information advertised in the CRLAM when the CRL is determined to be of interest.

3. The method as claimed in claim 2, wherein transmitting includes
   transmitting the updated CRLAM to other neighbor ad hoc nodes in the ad hoc network when the issuer certification authority (CA) is not of interest to the respective ad hoc node.

4. The method as claimed in claim 2, further comprising:
   determining, at each of the ad hoc nodes, whether the respective ad hoc node has a local copy of the CRL identified in the received CRLAM when the issuer certification authority (CA) specified in the issuer certification authority (CA) field is determined to be of interest to the respective ad hoc node.

5. The method as claimed in claim 1, wherein transmitting includes transmitting, from each of the ad hoc nodes, the locally updated CRLAM to other neighbor ad hoc nodes in the ad hoc network to advertise the updated CRL information to other neighbor ad hoc nodes in the ad hoc network.

6. The method as claimed in claim 4, wherein determining, at each of the ad hoc nodes, whether the respective ad hoc node has the local copy of the CRL identified in the received CRLAM comprises:
   comparing whether a sequence number of the particular CRL being advertised in a certificate revocation list (CRL) sequence number field is more recent than a local sequence number of the CRL that is stored locally at the respective ad hoc node.

7. The method as claimed in claim 2, wherein the issuer certification authority (CA) field comprises a Distinguished Name (DN) field of the issuer certification authority (CA).

8. The method as claimed in claim 2, wherein the issuer certification authority (CA) field comprises a Subject Alternative Name (SubjectAltName) field of the issuer certification authority (CA).

9. The method as claimed in claim 6, wherein the number specified in the sequence number field is based on the sequence number field from the particular certificate revocation list (CRL) that specifies a version of the particular certificate revocation list (CRL) that was issued by the issuer certification authority (CA).

10. The method as claimed in claim 1, wherein the address specified in the address field comprises one of: an IP address of an advertising node that generated the CRLAM, a URL address of an advertising node that generated the CRLAM, and a MAC address of an advertising node that generated the CRLAM.

11. The method as claimed in claim 1, wherein the data message comprises a plurality of certificate revocation list advertisement messages (CRLAMs), wherein each CRLAM is associated with a different certificate revocation list (CRL).

12. The method as claimed in claim 11, wherein each CRLAM is associated with a different certificate revocation list (CRL) associated with a different certification authority (CA).

13. The method as claimed in claim 12, wherein at least some of the different certification authorities (CAs) are from different security domains.

14. The method as claimed in claim 2, wherein the issuer certification authority (CA) is responsible for issuing other CRLs in addition to the particular certificate revocation list (CRL), and wherein the CRLAM further comprises:
    a certificate revocation list (CRL) identifier field that identifies the particular certificate revocation list (CRL) being advertised.

15. The method as claimed in claim 2, wherein the CRLAM further comprises: a certificate revocation list (CRL) identifier field that identifies the particular certificate revocation list (CRL) being advertised.

16. The method as claimed in claim 15, wherein determining, at each of the ad hoc nodes, whether the received CRLAM includes new CRL information, comprises:
    comparing, at each of the ad hoc nodes, a CRL identifier specified in the CRL identifier field and an issuer CA specified in the issuer CA field to a list of corresponding CRL identifiers and issuer CAs stored locally at the respective ad hoc node to determine whether the CRL identifier from the CRL identifier field and the issuer CA from the issuer CA field are different than those stored locally at the respective ad hoc node; and
    determining, at each of the ad hoc nodes, whether the received CRLAM includes new CRL information based on the result of comparing the CRL identifier and the issuer CA to the list of corresponding CRL identifiers and issuer CAs stored locally at the respective ad hoc node.

17. The method as claimed in claim 1, wherein the CRLAM comprises:
    an issuer certification authority (CA) field that identifies a certification authority (CA) that issued a particular certificate revocation list (CRL); and
    a certificate revocation list (CRL) sequence number field comprising a number that specifies the version of the particular certificate revocation list (CRL) issued by the issuer certification authority (CA) to uniquely identify the particular CRL.

18. The method as claimed in claim 1, wherein the determining step comprises:
    comparing the CRL information in the received CRLAM with a locally stored CRL information; and
    determining the CRL information in the received CRLAM is newer than the locally stored CRL information.

19. The method as claimed in claim 18, wherein the CRL information comprises one or more of a CRL identifier, an issuer CA of the CRL, a CRL sequence number, and a date.

20. The method as claimed in claim 1, wherein the ad hoc network is an autonomous ad hoc network.

21. The method as claimed in claim 1, further comprising:
    at an advertising node of the plurality of ad hoc nodes:
        obtaining CRL information from an infrastructure device;
        generating the data message comprising the at least one CRLAM based on the CRL information; and
        transmitting the data message to at least one neighbor ad hoc node in the ad hoc network.

* * * * *